United States Patent
O'Connor

(10) Patent No.: US 8,463,110 B2
(45) Date of Patent: *Jun. 11, 2013

(54) STORAGE OF VIDEO STREAM MULTIPLEXED WITH RANDOM ACCESS PLAYBACK AFTER VARIABLE TIME DELAY

(75) Inventor: Dennis M O'Connor, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 897 days.

This patent is subject to a terminal disclaimer.

(21) Appl. No.: 12/589,653

(22) Filed: Oct. 27, 2009

(65) Prior Publication Data

US 2010/0046914 A1   Feb. 25, 2010

Related U.S. Application Data

(63) Continuation of application No. 12/072,245, filed on Feb. 25, 2008, which is a continuation of application No. 11/174,906, filed on Jul. 5, 2005, now abandoned, which is a continuation of application No. 08/996,535, filed on Dec. 23, 1997, now Pat. No. 6,480,667.

(51) Int. Cl.
   *H04N 5/76*   (2006.01)
(52) U.S. Cl.
   USPC .......................................... 386/298; 386/235
(58) Field of Classification Search
   USPC ................. 386/235, 248, 298, 323, 326, 328, 386/353, 355
   See application file for complete search history.

(56) References Cited

U.S. PATENT DOCUMENTS

| | | | |
|---|---|---|---|
| 4,097,893 A | 6/1978 | Camras | |
| 4,183,056 A | 1/1980 | Evans et al. | |
| 4,845,564 A | 7/1989 | Hakamada et al. | |
| 5,040,061 A | 8/1991 | Yonemitsu | |
| 5,122,886 A | 6/1992 | Tanaka | |
| 5,134,499 A * | 7/1992 | Sata et al. | 386/248 |
| 5,241,428 A | 8/1993 | Goldwasser et al. | |
| 5,432,769 A | 7/1995 | Honjo | |
| 5,438,423 A | 8/1995 | Lynch et al. | |
| 5,446,488 A | 8/1995 | Vogel | |

(Continued)

FOREIGN PATENT DOCUMENTS

| | | |
|---|---|---|
| DE | 19737889 A1 | 3/1998 |
| EP | 789488 A3 | 8/1999 |

(Continued)

OTHER PUBLICATIONS

"Hitachi plans flexible DVD video recorder", Electronic Engineering Times, Jun. 16, 1997, p. 8.

(Continued)

*Primary Examiner* — Robert Chevalier
(74) *Attorney, Agent, or Firm* — Trop, Pruner & Hu, P.C.

(57) ABSTRACT

A method comprising, receiving a live video stream; recording the live video stream as a stored video stream; shifting the stored video stream as a time-delayed video stream; reading the time-delayed video stream; and playing back the time-delayed video stream whenever the time delay is greater than a predetermined threshold or playing back the live video stream whenever the time delay is less than the predetermined threshold.

16 Claims, 8 Drawing Sheets

U.S. PATENT DOCUMENTS

| | | |
|---|---|---|
| 5,479,302 A | 12/1995 | Haines |
| 5,485,219 A | 1/1996 | Woo |
| 5,526,130 A | 6/1996 | Kim |
| 5,541,738 A | 7/1996 | Mankovitz |
| 5,546,191 A | 8/1996 | Hibi et al. |
| 5,555,463 A | 9/1996 | Staron |
| 5,636,200 A | 6/1997 | Taira et al. |
| 5,701,383 A | 12/1997 | Russo et al. |
| 5,706,388 A | 1/1998 | Isaka |
| 5,721,878 A | 2/1998 | Ottesen et al. |
| 5,758,009 A | 5/1998 | Hashimoto et al. |
| 5,778,135 A | 7/1998 | Ottesen et al. |
| 5,778,137 A | 7/1998 | Nielsen et al. |
| 5,784,522 A | 7/1998 | Yamamura |
| 5,818,439 A | 10/1998 | Nagasaka et al. |
| 5,930,444 A | 7/1999 | Camhi et al. |
| 6,094,234 A | 7/2000 | Nonomura et al. |
| 6,233,390 B1 | 5/2001 | Yoneda |
| 6,310,839 B1 | 10/2001 | Lee et al. |
| 6,335,730 B1 | 1/2002 | Gould |
| 6,477,312 B1 | 11/2002 | Houston |
| 6,480,667 B1 | 11/2002 | O'Connor |
| 6,614,986 B2 | 9/2003 | Tognazzini |
| 2002/0048448 A1 | 4/2002 | Daniels |
| 2002/0176689 A1 | 11/2002 | Heo et al. |
| 2003/0122941 A1 | 7/2003 | Okayama et al. |
| 2003/0165324 A1 | 9/2003 | O'Connor et al. |

FOREIGN PATENT DOCUMENTS

| | | |
|---|---|---|
| JP | 61017242 | 1/1986 |
| JP | 61017243 | 1/1986 |
| JP | 0244569 | 2/1990 |
| JP | 7131754 A2 | 5/1995 |
| JP | 7240899 A | 9/1995 |
| JP | 7264529 A | 10/1995 |
| JP | 8237592 A | 9/1996 |
| JP | 8279976 A2 | 10/1996 |
| JP | 09095325 A | 4/1997 |
| JP | 9247602 A | 9/1997 |
| JP | 1056620 | 2/1998 |
| WO | 95/32584 A1 | 11/1995 |
| WO | 99/33265 A1 | 7/1999 |

OTHER PUBLICATIONS

Yeo et al., "Rapid Scene Analysis on Compressed Video", IEEE Transactions on Circuits and Systems for Video Technology, vol. 5, No. 6, Dec. 1995, pp. 533-544.

* cited by examiner

STORAGE OF VIDEO STREAM MULTIPLEXED WITH RANDOM ACCESS PLAYBACK AFTER VARIABLE TIME DELAY

SPECIFICATION

This is a Continuation Application of Ser. No. 12/072,245, filed on Feb. 25, 2008, which is presently pending, which is, in turn, a Continuation application Ser. No. 11/174,906, filed on Jul. 5, 2005, which has been abandoned, which is, in turn, a Continuation application Ser. No. 08/996,535, filed on Dec. 23, 1997, which has been issued as U.S. Pat. No. 6,480,667 B1 on Nov. 12, 2002.

BACKGROUND OF THE INVENTION

1. Field of the Invention

The described invention relates to the field of imaging. In particular, the invention relates to the recording and playing back of a video stream. A video stream includes any combination of audio and/or video data streams. However, the concepts disclosed may be applied to other types of data streams.

2. Description of Related Art

Video streams have typically been recorded on analog media such as a video cassette. A video cassette recorder (VCR) is used to record the video stream on the video cassette. The video stream may come via a broadcast signal, via cable, via satellite signal, or from another video playback device. Once the video stream has been recorded, the VCR is used to rewind the recording medium and play what was recorded. However, due to the nature of the analog medium, once the VCR has started recording, it is not possible to play back the portion of the video stream that has already been recorded until the recording session is terminated.

For example, imagine that a person sets up a VCR for recording a one hour show because he knows that he will miss the first 15 minutes of the show. When he arrives home 15 minutes into the show, he will have to wait for the entire show to be recorded before he can start watching the program from the beginning. A way of being able to view the show from the beginning without having to wait for the recording session to terminate is desirable.

DETAILED DESCRIPTION

The Apparatus

Figure 1:
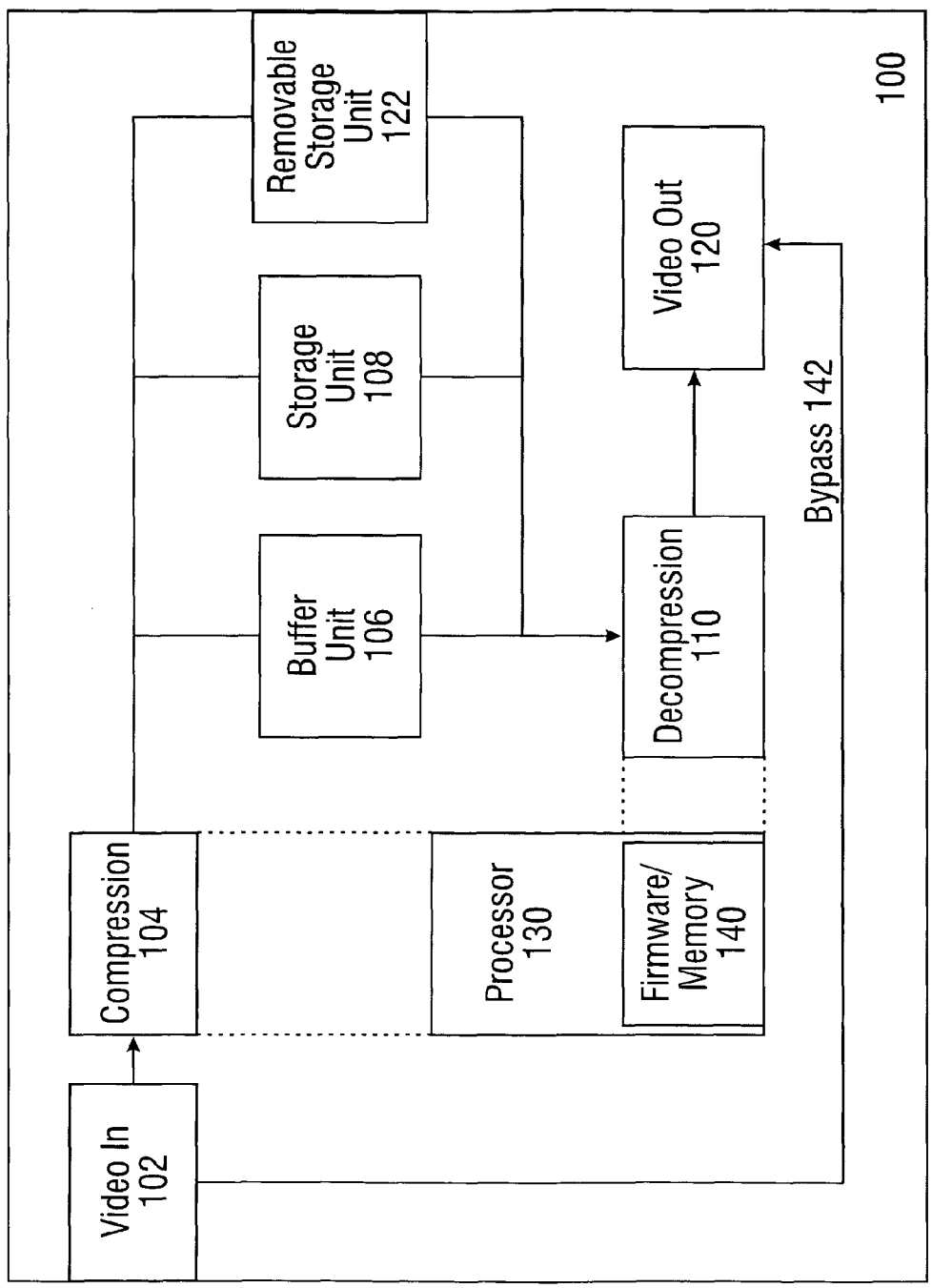
FIG. 1 shows a block diagram of a video record and playback system in accordance with one embodiment of the invention.

FIG. 1 shows a block diagram of a video record and playback system 100 in accordance with one embodiment of the invention. A video stream is received at the VIDEO IN 102. The video stream may be provided by a camera, a television signal, broadcast, cable, or satellite signals, or another video playback device. In one embodiment, the VIDEO IN 102 performs an A to D function that takes analog NTSC signals coming in and decodes the video stream into a digital video bit stream. In a different embodiment, the video is already in digital form. In one embodiment, video record and playback system 100 is a personal computer system, and the VIDEO IN 102 is a video capture card plugged into the personal computer system.

The video stream output of the VIDEO IN 102 is optionally compressed at compression unit 104. In one embodiment, the video is already compressed, such as would be the case with an MPEG2 video signal, and no further compression is needed. The video stream is then stored into storage unit 108. Buffer unit 106 may be used as a temporary storage unit for providing larger sequential blocks of video data to the storage unit 108.

In one embodiment, storage unit 108 is a random access memory unit that allows relatively quick access to any portion of the stored video stream. A hard disk is an example of a random access memory unit. A hard disk can typically access stored data with access times that are on the order of 10 ms. In contrast, video cassette tapes are mechanically wound to get to a particular point in the video stream.

The video stream is played back by reading the video stream from the storage unit 108. If the video stream was compressed in compression unit 104, then a decompression unit 110 decompresses the retrieved video stream. The video stream is provided to a VIDEO OUT port 120, to which a monitor or other display device is connected to provide sound and/or video to a user.

A removable storage unit 122 may also be included in video record and playback system 100. Examples of removable storage units are a writeable CD ROM, writeable DVD, a flash memory, or another hard disk. The removable storage unit 122 allows a user to transfer a recording of a video stream stored in storage unit 108 to the removable storage unit 122.

In one embodiment, a processor 130 controls the operations of the video record and playback system 100. The compression unit 104 and decompression unit 110 may be implemented in hardware, or the compression and decompression functions of units 104 and 110 may be performed by the processor 130. Processor 130 receives instructions from firmware/memory 140, using technology that is well-known.

Record and Playback Cycle

Figure 2:
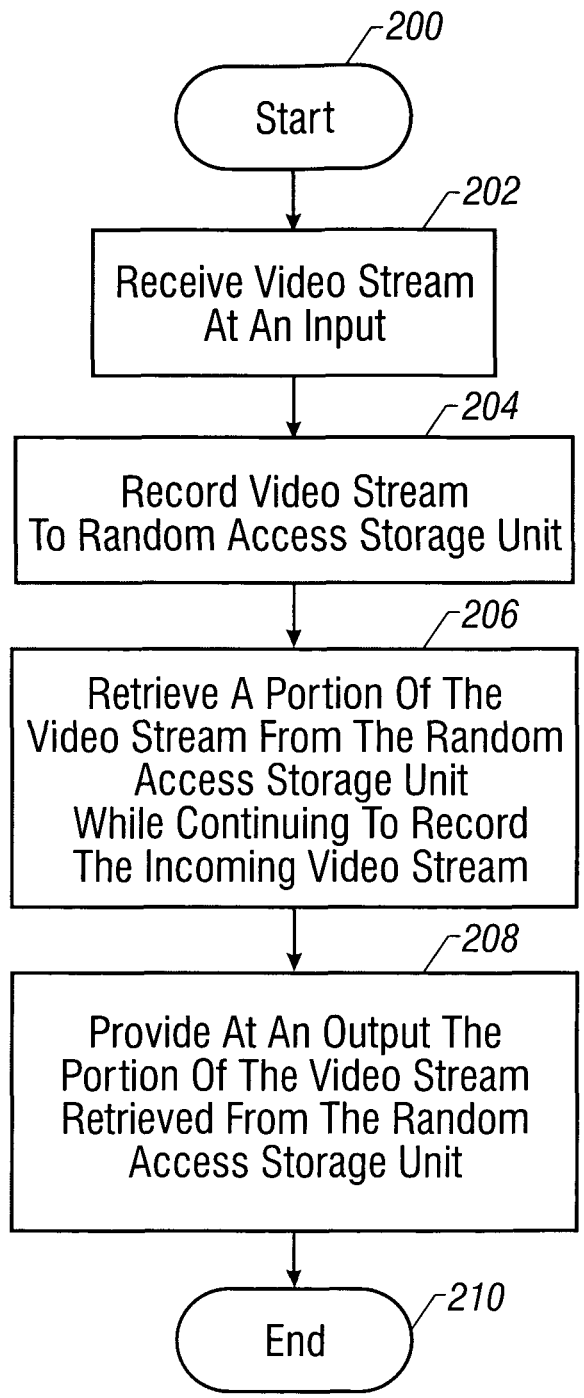
FIG. 2 shows a flowchart of the method of providing a time-shifted video stream.

FIG. 2 shows a flowchart of the method of providing a time-shifted video stream. The flowchart begins at block 200, and continues at block 202 at which the video stream is received at an input. The video stream begins being recorded at block 204. At block 206, playback of the video stream that has been recorded is performed by retrieving a portion of the video stream from the random access storage unit while the recording of the incoming video stream continues. The retrieved portion of the video stream is time-shifted from the incoming video stream by a time delay.

At block 208, the portion of the video stream retrieved from the random access storage unit is provided at an output of the video record and playback system 100. The retrieved portion of the video stream can then be displayed by a television or other display device.

By using the method of FIG. 2, the record and playback functions are decoupled from one another. The user may now begin watching a recorded TV show from the beginning, i.e, prior to the show being completely recorded.

Figure 3:
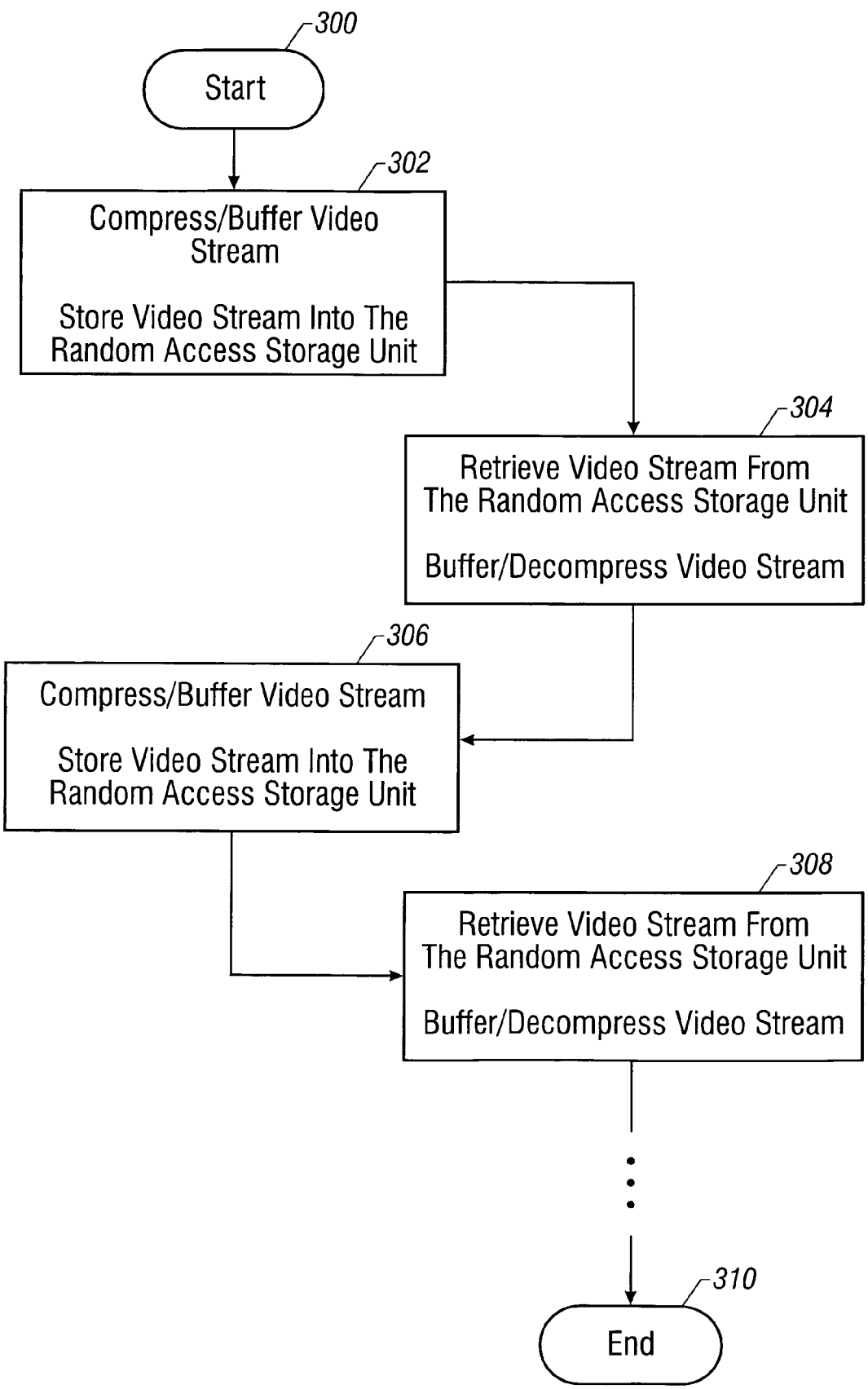
FIG. 3 shows one embodiment of performing block 206 of FIG. 2.

FIG. 3 shows one method for performing block 206 of FIG. 2 of retrieving a portion of the video stream from the random access storage unit while continuing to record the incoming video stream. In the disclosed embodiment, the simultaneous recording and playback of the video stream is performed by alternately performing, or multiplexing, one or more stores of the video stream to the random access storage unit with one or more reads of the video stream from the random access storage unit. The multiplexed stores and reads occur quickly enough that the user does not notice an appreciable delay in the playback of the video stream, and none of the incoming video stream is lost, i.e., all of the video stream is recorded. Thus, the record and playback are simultaneous from the user's point of view.

In one embodiment, the random access storage unit is a hard disk. The retrieval of the time-shifted video signal from the hard disk is performed at a first physical location (or sector) of the hard disk, and the storing to the hard disk of the incoming video stream is performed at a different physical location (or sector) on the hard disk. Because it takes more time to jump back and forth between different sectors of the hard disk than the time it takes to read and write to sequential locations in the same sector, data may be buffered to minimize the number of accesses to and from the hard disk using buffer 106. This increases the amount of data transferred per access.

Additionally, because of time constraints for reading and writing to the hard disk, data may be compressed and decompressed to speed transfers to and from the hard disk.

In block 302, the video stream is stored to a random access storage unit. The video stream is optionally compressed and/or buffered prior to storage. In block 304, the video stream retrieved from the random access storage unit. Buffering and/or decompression may be performed before providing the retrieved video stream to the VIDEO OUT port 120.

From block 304, the flowchart proceeds at block 306 which stores the next portion of the video stream in a manner similar to that described in block 302. At block 308, the next portion of the video stream is retrieved in a manner similar to that described in block 304. This process is repeated until either the recording or playback cycle is terminated.

Figure 4:
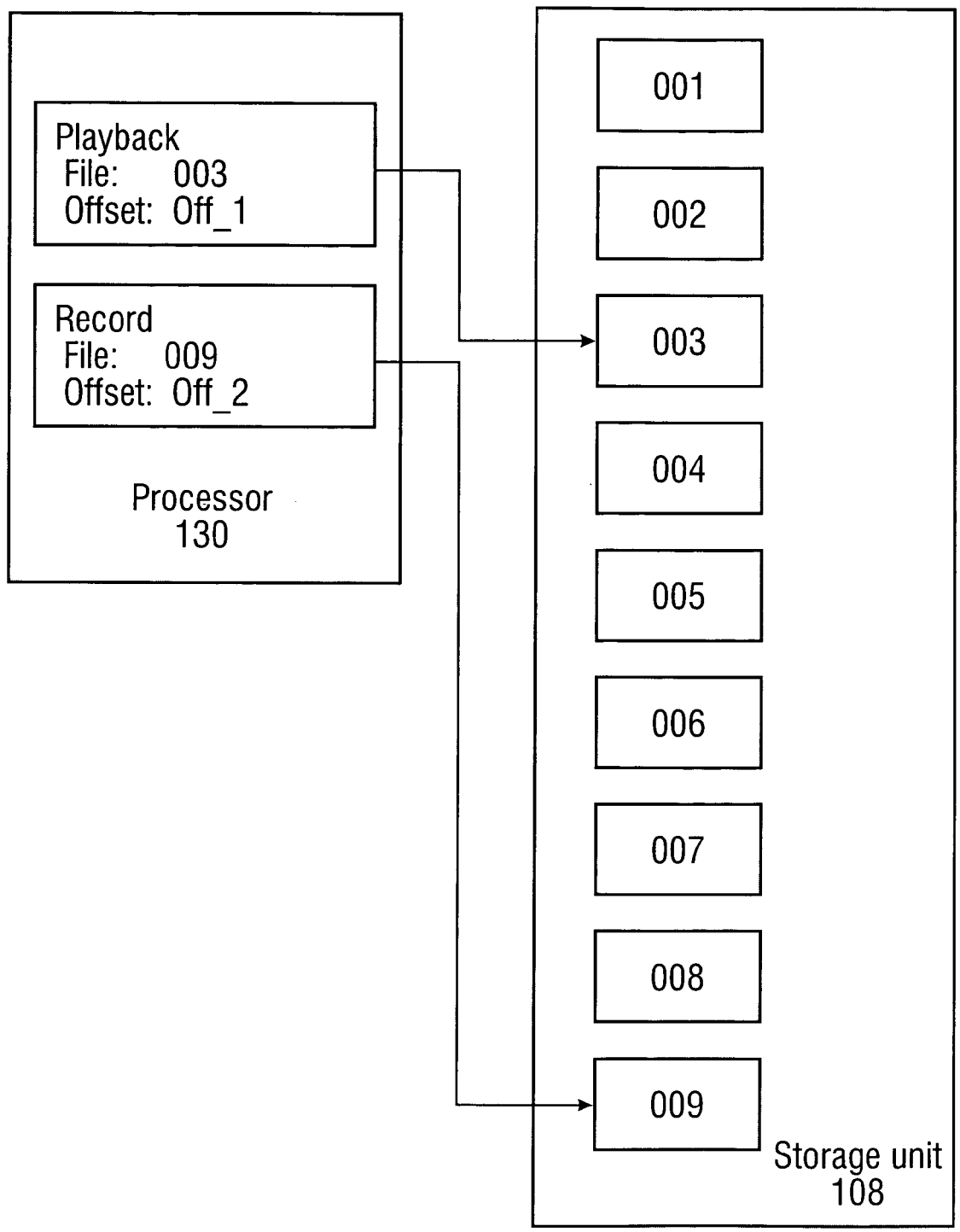
FIG. 4 shows one embodiment of an apparatus for storing the video stream on a hard disk.

FIG. 4 shows one embodiment of an apparatus for storing the video stream in the storage unit 108. In this embodiment, the video stream is stored as separate files 001 to 009 on a hard disk, for example. The processor 130 keeps track of the file and offset into the file of the data being played back, as well as the file and offset into the file of the data being recorded. If the random access storage unit is fast enough, the more than one video stream can be recorded and played back at the same time.

Temporary Buffering (Circular Buffering)

Due to the nature of the random access storage unit being capable of easily recording over itself, the random access storage unit may act as a temporary buffer for recording the latest portion, or X number of minutes, of an incoming video stream, where X is set up based upon the size of the storage unit. In one embodiment, X could be set up to be the entire storage unit. As newer portions of the video stream are received, they will overwrite the older portions of the video stream saved in the random access storage unit. In this manner, the temporary buffering of the video stream acts as a circular buffer. In one embodiment, the processor 130 maintains pointers to the beginning and ending points of the temporary buffer. The processor 130 reassigns the pointers as newer portions of the video stream are received and/or older portions of the video stream are overwritten.

Figure 5:
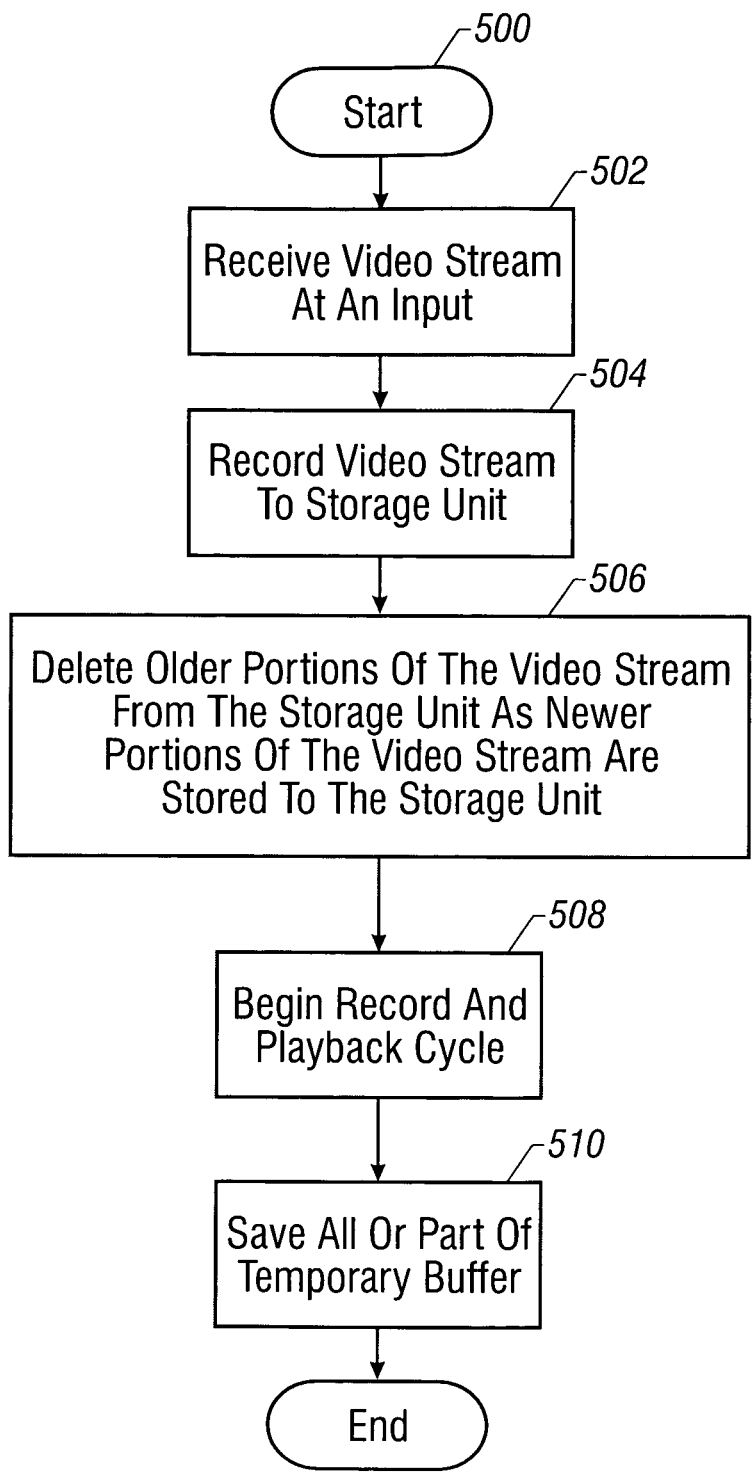
FIG. 5 shows an exemplary method of using the storage unit as a temporary buffer.

FIG. 5 shows a flowchart of one method for using the storage unit as a temporary buffer. The flowchart starts at block 500 from which it continues at block 502, at which the video stream is received at an input. Recording of the video stream to the storage unit begins at block 504. At block 506, older portions of the video stream are deleted as newer portions of the video stream are stored to the storage unit.

A user may initiate a playback cycle following block 506. For example, this may occur when the user wishes to re-view a video clip that he just saw. In one embodiment, the user stops recording to the temporary buffer and plays back the last portion of the temporary buffer.

However, it may be more desirable to the user to be able to continue recording as shown at block 508. A record and playback cycle (as described with respect to FIG. 2) is started, in which the incoming video stream is recorded while the user re-views the last portion of the temporary buffer. In this manner, after re-viewing the desired video clip, the user can resume sequentially watching the video stream from the point of the video clip.

At block 510, after the record and playback cycle is completed, all or part of the temporary buffer may be saved. Since the temporary buffer store the latest X minutes of the video stream prior to the record and playback cycle, all or part of the temporary buffer may be allocated to the portion of the video stream saved during the record and playback cycle. Other portions of the video stream may then be deleted from the storage unit, or they may be marked as over-writeable and used as a new temporary buffer.

Playback Catching Up to Incoming Video Stream

Figure 6:
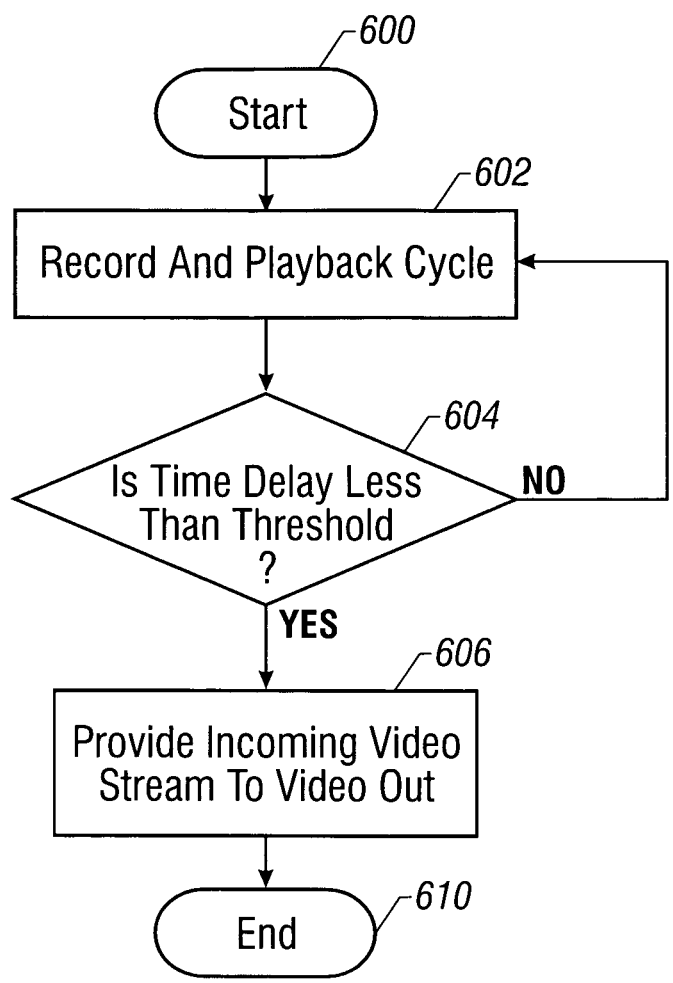
FIG. 6 shows a flowchart of the playback of a video stream catching up to the incoming video stream.

FIG. 6 shows a flowchart of a method for playing back of a video stream in a manner that allows it to catch up to the incoming video stream. Usually, during simultaneous playback and recording of the same video stream, the playback of the video stream is time-shifted from the incoming video stream by a time delay. However, if the playback is performed at an overall rate faster than the rate at which the incoming video stream is received, then the playback will catch up to the incoming video stream.

For example, playback of the video stream will have an overall rate faster than the rate of the incoming video stream if the playback is fast forwarded, or if segments of the playback are skipped altogether. When the time delay of the time-shifted video stream being played back falls below a certain threshold, the video and playback system 100 will cease providing the time-shifted video stream from the storage unit. Instead, the incoming video stream will be provided to the VIDEO OUT port 120 directly. In one embodiment, a bypass 142, as shown in FIG. 1, allows the incoming video stream to be provided to the VIDEO OUT port 120 directly.

When this happens, the user has caught up to the "live" broadcast, i.e., the incoming video stream. The user may terminate the recording cycle, if he wishes. Alternatively, the user can put the video record and playback system 100 back into the temporary buffering mode in which only the latest portion of the video stream is stored.

"Suspending" Incoming Video Stream

Figure 7:
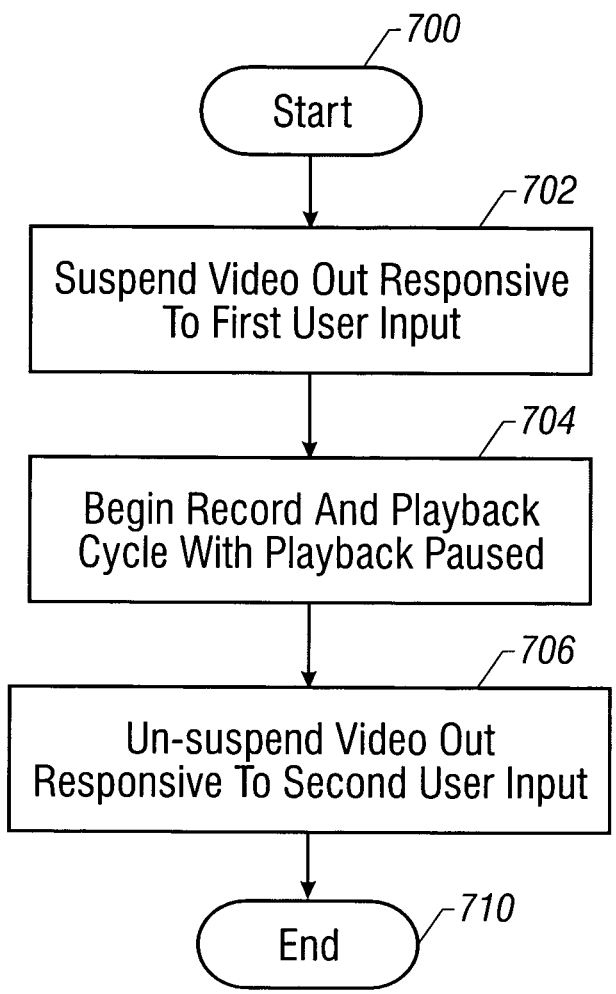
FIG. 7 shows another embodiment, in which the user is able to suspend the display of the incoming video stream.

FIG. 7 shows another embodiment, in which the user is able to suspend the display of the incoming video stream. This can be used for example, when the user is interrupted, and wishes to continue viewing the video stream after the interruption. When interrupted, the user signals to the video record and playback system 100 to suspend the display of incoming video stream. This can be done via a remote control, for example. At block 702, the video out is suspended. In one embodiment, the VIDEO OUT continues to provide a still image of the image present at the VIDEO OUT when the suspend was encountered.

At block 704 of the flowchart, the incoming video stream is recorded but is not displayed to the monitor. Instead the playback is paused at the point at which the user indicated that the incoming video stream be suspended. When the user is ready to view the video stream again, he can signal the video record and playback system 100 to un-suspend the video stream so that it plays back from the point at which the video stream was suspended, as shown in block 706.

The user may then view the video stream time shifted by the amount of time that he suspended the incoming video stream, or he may fast forward (or rewind) through the time-shifted video stream. When playback of the time-shifted video stream catches up to the point at which the incoming video stream is being recorded, the record and playback system 100 may display the incoming video stream directly from incoming video stream without retrieving the video stream from the storage unit, as described with respect to FIG. 6. The recording of the video stream may then be terminated by the user, if desired.

Story Boarding: Fast Forward and Rewind

Employing a random access storage unit for storage of the video stream facilitates jumping to various points within the video stream. One way of jumping is by retrieving different time slices of the video stream. For example, an image frame from the video stream can be retrieved from the storage unit at 1 minute intervals from a current position of the video stream. In one embodiment, an image frame at the current playback position+1 minute, current playback position+2 minutes, and so forth are retrieved and displayed on the TV screen.

Figure 8:
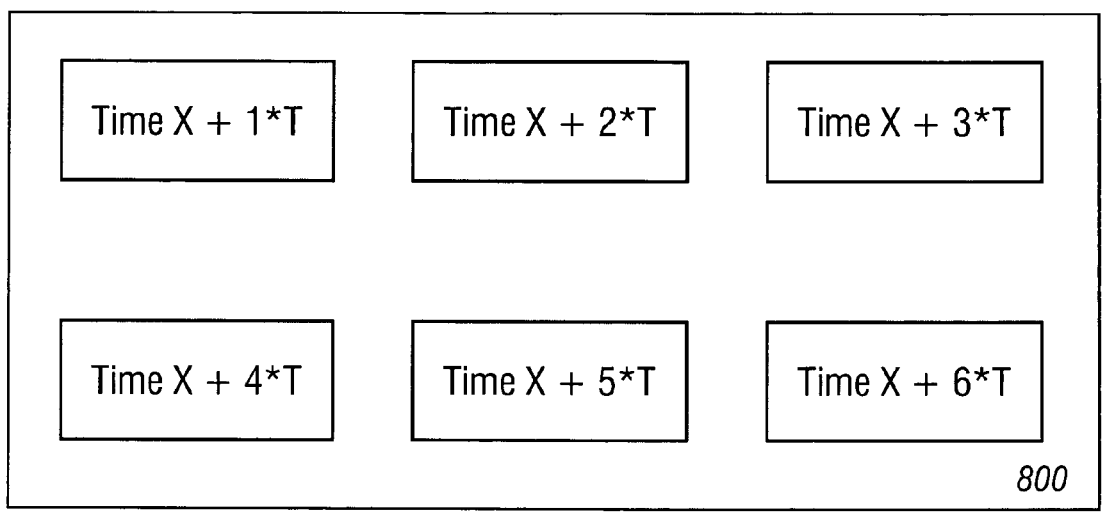
FIG. 8 shows an example of a display screen with several image frames taken at different times.

FIG. 8 shows an example of a display screen 800 which displays several image frames taken from the video stream at different times. In FIG. 8, the current playback position is designated as X. In one embodiment, the time interval, T, is user programmable. The intervals may be multiples of the time interval, as shown. A small interval may be used if the user wishes to skip a commercial, which usually lasts only a few minutes. Longer intervals such as a half hour may be useful for determining which movies are recorded on a storage unit.

After the image frames are displayed, the user is able to select one of the frames as a new starting point to which to begin an operation, such as a playback or record operation. By using such a story boarding method, it is easy for a user to quickly jump to a desired location within the video stream.

In one embodiment, the record and playback system 100 is able to detect a black screen or fade out, such as those which accompany the beginning or end of a commercial. This is useful in editing a video stream.

Editing

Having the video stream stored on a random access storage unit such as a hard disk allows for easy editing of the video stream. Individual frames of the video stream may be deleted or replaced. For example, a commercial may be replaced by a fade-to-black sequence.

Once the video stream on the storage unit has been edited, it can be stored to a more permanent medium such as a writeable CD-ROM, flash memory, or another hard disk via the removable storage unit 122.

Conclusion

Thus, a method of simultaneously recording and playing back a time-shifted video stream is disclosed. The specific arrangements and methods described herein are merely illustrative of the principles of this invention. For example, the same method may be used to store and retrieve other types of data streams besides video streams. Numerous modifications in form and detail may be made without departing from the scope of the described invention. Although this invention has been shown in relation to a particular embodiment, it should not be considered so limited. Rather, the described invention is limited only by the scope of the appended claims.

The invention claimed is:

1. A method comprising:
   receiving a live video stream;
   recording the live video stream as a stored video stream;
   shifting the stored video stream as a time-delayed video stream;
   reading the time-delayed video stream; and
   playing back the time-delayed video stream whenever the time delay is greater than a predetermined threshold or playing back the live video stream whenever the time delay is less than the predetermined threshold.

2. The method of claim 1 further comprising multiplexing the recording and the reading.

3. The method of claim 1 wherein a rate of playing back the time-delayed video stream is changed.

4. The method of claim 1 wherein portions of the stored video stream are skipped.

5. The method of claim 1 wherein the live video stream is digitized before recording.

6. The method of claim 1 wherein the live video stream is compressed before recording and the time-delayed video stream is decompressed before reading.

7. The method of claim 1 wherein the live video stream is buffered before recording and the time-delayed video stream is buffered before reading.

8. The method of claim 1 wherein the time delay is variable over time.

9. The method of claim 1 wherein the time delay is specified by a user.

10. The method of claim 1 wherein a rate of playing back the time-delayed video stream is faster than a rate of storing the live video stream.

11. The method of claim 1 wherein a rate of playing back the time-delayed video stream is slower than a rate of storing the live video stream.

12. The method of claim 1 wherein the reading of the time-delayed video stream comprises random access.

13. The method of claim 1 wherein the playing back of the time-delayed video stream comprises random access.

14. The method of claim 1 wherein the predetermined threshold is specified by a user.

15. A method comprising:
    receiving a video stream;
    alternately storing the received video stream and retrieving the stored video stream;
    shifting the stored video stream from the received video stream by a time delay;
    playing back the shifted video stream until the time delay is less than a predetermined threshold, and then playing back the received video stream instead.

16. The method of claim 15 wherein the storing and the playing back are multiplexed.

* * * * *

UNITED STATES PATENT AND TRADEMARK OFFICE
CERTIFICATE OF CORRECTION

| | | |
|---|---|---|
| PATENT NO. | : 8,463,110 B2 | Page 1 of 1 |
| APPLICATION NO. | : 12/589653 | |
| DATED | : June 11, 2013 | |
| INVENTOR(S) | : O'Connor | |

It is certified that error appears in the above-identified patent and that said Letters Patent is hereby corrected as shown below:

On the title page, item [63] and in the Specification, Col. 1, lines 8-14:

"Continuation of application No. 12/072,245, filed on Feb. 25, 2008, which is a continuation of application No. 11/174,906, filed on Jul. 5, 2005, now abandoned, which is a continuation of application No. 08/996,535, filed on Dec. 23, 1997, now Pat. No. 6,480,667."

should be:

--Continuation of U.S. patent application Ser. No. 12/072,245, filed on Feb. 25, 2008 now U.S. Pat. No. 8,452,154, which is a continuation of U.S. patent application Ser. No. 09/223,516, filed Dec. 30, 1998 now U.S. Pat. No. 7,359,619, which is a continuation-in-part of U.S. patent application Ser. No. 09/150,577, filed Sep. 10, 1998 now abandoned, which is a continuation-in-part of U.S. patent application Ser. No. 08/996,535, filed Dec. 23, 1997 now U.S. Pat. No. 6,480,667.--

Signed and Sealed this
Twenty-second Day of July, 2014

Michelle K. Lee
*Deputy Director of the United States Patent and Trademark Office*